United States Patent [19]

Bratkowski et al.

[11] 3,725,807

[45] Apr. 3, 1973

[54] DIRECT CURRENT AMPLIFIER

[75] Inventors: Walter V. Bratkowski, McKeesport; Paul F. Pittman, Pittsburgh, both of Pa.

[73] Assignee: Westinghouse Electric Corporation, Pittsburgh, Pa.

[22] Filed: Aug. 31, 1970

[21] Appl. No.: 68,223

[52] U.S. Cl. ......................330/185, 330/24, 330/51, 330/300, 330/69

[51] Int. Cl. ..............................................H03f 1/00

[58] Field of Search ..................330/9, 185, 69, 30 D

[56] References Cited

UNITED STATES PATENTS

| | | | |
|---|---|---|---|
| 2,705,265 | 3/1955 | Hall | 330/69 |
| 2,780,682 | 2/1957 | Klein | 330/69 |
| 3,516,005 | 6/1970 | Brown, Jr. | 330/69 |
| 3,530,396 | 9/1970 | Rudolph | 330/69 |

*Primary Examiner*—Nathan Kaufman

*Attorney*—A. T. Stratton, C. L. Freedman and John L. Stoughton

[57] ABSTRACT

A self-contained direct current amplifier for a sensing network wherein the high gain amplifier may be balanced independently of the sensing network feeding the amplifier and wherein the output potential applied by the sensing network to the high gain amplifier may be balanced independently of the amplifier and in which the amplifier supplies the power for the sensing network and the balancing power for determining the balance between the sensing network output and the high gain amplifier input as well as for the power to the high gain amplifier itself.

13 Claims, 1 Drawing Figure

PATENTED APR 3 1973 3,725,807
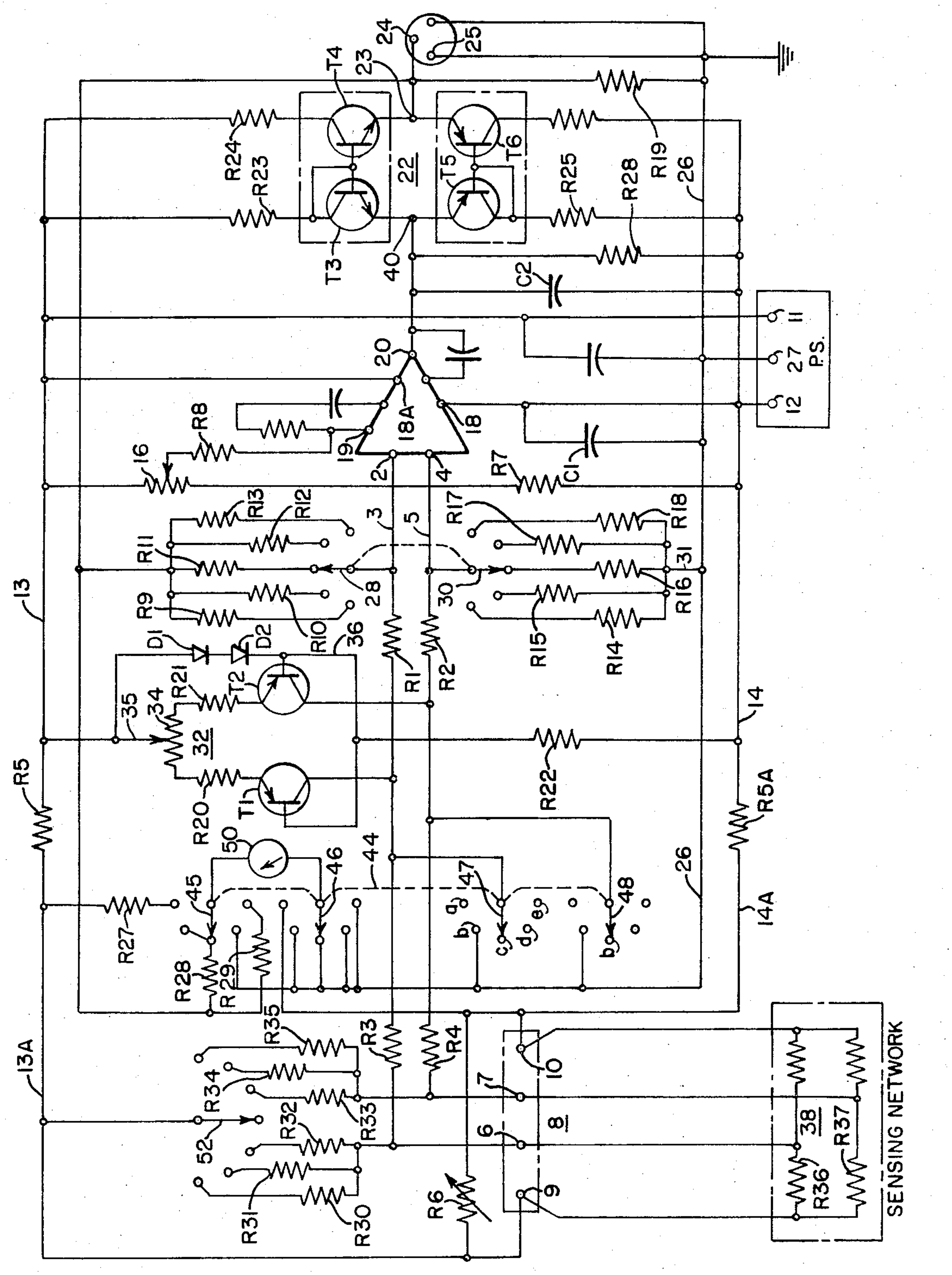
WITNESSES
INVENTORS
Walter J. Bratowski &
Paul F. Pittman
ATTORNEY

DIRECT CURRENT AMPLIFIER

BRIEF SUMMARY OF THE INVENTION

The invention relates to a high gain amplifier for sensing networks wherein unbalance in the sensing network may be independently corrected for by means of adjusting a constant current energization of one of a pair of impedance elements and wherein all of the power demands as well as those for the sensing network are obtained from a single power source.

FIG. 1 is a schematic diagram of a direct current amplifier embodying the invention and connected to be controlled by means of a sensing bridge such as a strain gauge.

Referring to the drawing by characters of reference the numeral 1 represents generally a high gain amplifier such as that sold by Fairchild Semiconductor Company as type *Ma*–709C. This amplifier has a pair of input terminals or connections 2 and 4 which are connected through the usual gain control resistors R1 and R2 by resistors R3 and R4 and conductors 3 and 5 to a pair of input terminals 6 and 7 of a first plurality of terminals generally designated 8. Terminals 9 and 10 of this first plurality of terminals 8 are connected to the positive and negative input terminals 11 and 12 by means of conductors 13 and 14 respectively. A variable resistor R6 is connected between the terminals 9 and 10. A voltage dropping resistor R5 is connected in series between the conductor 13 and the terminal 9. A second resistor R5A is connected in series between the conductor 14 and the terminal 10. THe The adjustment of resistor R6 controls the current flowing through the variable resistor R6 and resistors R5 and R5A to adjust the potential supplied by the conductor portions 13A and 14A to the power input terminals 9 and 10.

A resistance element of a potentiometer 16 is connected between the busses 13 and 14 on the supply side of the resistors R5 and R5A in series with a resistor R7. One power input terminal or connection 18 of the amplifier 1 is connected to the negative power supplying conductor 14 while the other power input terminal or connection 18A is connected to the positive power supplying conductor 13. A balancing potential terminal or connection 19 is connected through a resistor R8 to the movable tap of the potentiometer 16. The output terminal or connection 20 of the amplifier 1 is connected through a current amplifier generally designated 22 to the amplifier output terminal 24. The other output terminal 25 is connected to the ground bus 26. The bus 26 is connected to a terminal 27 of the same DC power source PS which supplies the terminals 11 and 12 and maintained at a potential preferably exactly midway between that of the positive and negative terminals 11 and 12.

The gain of the amplifier 1 is controlled by a pair of switches 28 and 30 which select the desired pair of the gain controlling resistors R9–13 and R14–R18, respectively. The common connection of the resistors R9–R13 is connected to output terminal 23 of the amplifier 22. A resistor R19 connects the terminal 23 to the ground bus 26. The common connection of the resistor R14–R18 is connected by a conductor 31 directly to the bus 26. The switch arm of the switch 28 is connected to the conductor 3 between the resistor R1 and the input terminal 2 while the arm of the switch 30 is connected to the conductor 5 between the resistor R2 and the input terminal 4 of the amplifier 1. The switches 28 and 30 are preferably interconnected as diagrammatically indicated so that the same amplification will be made of the signals at both of the input terminals 2 and 4.

The bias potential established across the resistors R3 and R4 is determined by a constant current network 32 which includes a pair of transistors T1, T2 a pair of semiconductor diodes D1 and D2, a plurality of resistors R20, R21 and R22 and a potentiometer 34. The arm 35 of the potentiometer 34 is connected to the plus terminal 11 of the voltage supply by the conductor 13. One end of the resistance of the potentiometer 34 is connected through the resistor R20 and the emitter and the collector of the transistor T1 to the bus 3 between the resistors R1 and R3. Similarly the other terminal of the resistor of the potentiometer 34 is connected through a resistor R21 and the emitter and the collector of the transistor T2 to the bus 5 between the resistors R2 and R4. The bases of the transistors T1 and T2 are connected to a common bus or conductor 36 which is connected through the resistor R22 and conductor 14 to the negative terminal 12 and which is connected through the diodes D1 and D2 and conductor 13 to the positive terminal 11. The magnitudes of the constant currents flowing through the resistors R3 and R4 to establish the desired bias potential thereacross are determined by the setting of the potentiometer 34. This current flows through the sensing network 38, terminal 10, to resistor R5A and conductor 14 to the negative terminal 12 of the second plurality of terminals.

The current amplifier 22 comprises a first set of transistors T3 and T4 of the NPN type and a second set of transistors T5 and T6 of the PNP type. The transistors T3 and T4 are preferably associated together in any desired manner whereby the temperatures of both of these transistors will be substantially the same. Preferably the transistors T3 and T4 are as nearly identical as possible and may be of the so-called integrated-circuit type. The transistors T3 and T4 have their collectors connected to the positive bus 13 through resistors R23 and R24, respectively. The emitter of the transistor T3 is connected to the input terminal 40 of the current amplifier while the emitter of the transistor T4 is connected to the output terminal 42 of the current amplifier. The transistor T3 operates as a diode because of the connection of its base to its collector.

The transistors T5 and T6, like the transistors T3 and T4, preferably are of substantially identical construction and arranged so that the temperatures of both thereof will remain substantially the same.

The emitter of the transistor T5 is connected to the input terminal 40 and the collector thereof is connected through a resistor R25 to the negative bus 14. Similarly, the emitter of the transistor T6 is connected to the output terminal 23 and its collector is connected through a resistor R26 to the negative bus 14. The transistor T5 like the transistor T3 acts as a diode since its base is connected to its collector.

The amplifier is provided with a function switch 44 which is movable into a number of positions to permit balancing and calibration. The switch 44 has a plurality of switch sections 45, 46, 47 and 48 which are movable concurrently. In its first or *a* position, the sections 45 and 46 of the switch 44 connect an instrument 50 between the conductor portions 13A and 14A through a resistor. The instrument may be of the usual D'Arsonval type and, for example, may be driven to full scale by 1 milliampere of current. Assuming an input potential of 20 volts applied by the terminals 11 and 12 between the busses 13 and 14, the magnitude of resistance of the resistors R5 and R5A may be 150 ohms, the magnitude of the resistance of the variable resistor R6 may have a maximum magnitude of 500 ohms, and the resistor R27 may have a value of 12,000 ohms. By adjusting the variable resistor R6 and observing the instrument 50, the proper voltage between the power terminals 9 and 10 may be obtained.

In its second or *b* position, the sections 45 and 46 of the switch 44 connect the instrument 50 between the output terminal 23 and the ground bus 26 through a resistor R28 and the sections 47 and 48 connect the input terminals 2 and 4 to the ground bus 26 through the resistors R1 and R2. With the function switch 44 in this position, the amplifier balancing potentiometer 16 is adjusted until the instrument 50 reads zero indicating that with no input signal to the amplifier 1 the potential of its output terminal 23 is exactly that of the ground bus 26 and terminal 27.

In its third or *c* position the sections 45 and 46 of the function switch connect the instrument 50 between the output terminal 23 of the amplifier and the ground bus 26 but in this position, the sections 47 and 48 do not short the input terminals 2 and 4. With the function switch 44 in its *c* position, the potentiometer 34 is adjusted to bring the potential of the output of the amplifier 23 to that of the ground bus 26 as indicated by a zero reading on the instrument 50. It may be desirable to recheck the balance of the amplifier 1 and thereafter that of the signal applied by the resistors R3 and R4.

In a fourth or *d* position the switch 44 maintains the instrument 50 disconnected and with the switch portions 45 and 46 shorting its terminals. This is the operating position of the function switch 44 in which the amplifier provides an output potential between its output terminals 24 and 25 which is a measure of the input potential applied by the sensing network 38 to the input terminals 6 and 7.

In a fifth or *e* position the sections 45 and 46 of the function switch 44 connect the instrument 50 between the output terminal 23 of the amplifier 1 and the ground bus 26 through a resistor R29. With the function switch 44 in its position *e*, the calibrate switch 52 is adjusted to insert the proper one or more of the resistors R30–R35 to calibrate the sensing network 38. In this regard it will be noted that the calibrate switch 52 is effective to connect the resistors R30–R32 in shunt with the resistor R36 and the resistors R33–R35 in shunt with the resistor R37 of the sensing network 38.

The magnitudes of the resistance of the resistors R3 and R4 are small when compared to the magnitudes of the resistance of the resistors R1 and R2. The presence of the resistors R3 and R4 has no substantial effect upon the amplifier 1. For example, the magnitudes of resistance of R3 and R4 may be on the order of 100 ohms while that of the resistors R1 and R2 may be in the order of 10,000 ohms which is an order of magnitude equal to 2. A capacitor C1 is preferably inserted between the power terminal 18 and the ground bus 26 to bypass any high frequency which may be present at this location. The capacitor C2 and resistor R38 are connected in parallel between the output terminal 20 and the negative bus 14 to reduce any high frequency oscillation that might otherwise develop at the output of the amplifier 1.

It is believed that the remainder of the details of construction of the amplifier will best be understood by reference to the operation thereof which is as follows. The busses 13, 14 and 26 are energized respectively by the terminals 11, 12 and 27 from the direct current supply (not shown). Such a supply may take any of the forms well known in the art and preferably is derived from a suitable rectifier network energized with alternating power from a suitable power source. The sensing network 38 is connected to the terminals 8. Thereafter the function switch 44 is placed in its *a* position and the magnitude of resistance of the resistor R6 is adjusted to apply the correct potential to the network 38. Thereafter the function switch 44 is placed in its *b* position and the potentiometer 16 is adjusted to cause the amplifier to provide a zero output. Thereafter the switch 44 is placed in its *c* position and the potentiometer 34 is adjusted to provide potentials across the resistors R3 and R4 to compensate for any unbalance of the sensing network 38. In many instances it may be desirable to recheck the balance afforded by the potentiometer 16 and 32 a number of times. However, when a balance at positions *b* and *c* is obtained the gain afforded the amplifier by the switches 28 and 30 may be adjusted upwardly and downwardly as desired without being effected by any unbalance in the network 38 since it is compensated for by the bias potentials established in the resistors R3 and R4, by the constant current network 32. The function switch 44 is thereafter placed in its *e* position to check the calibration of the amplifier with respect to the particular sensing network 38. By properly adjusting the calibrate switch 52 and observing the instrument 50, it is possible to obtain the desired output at terminals 24 and 25 for a desired operation of the sensing network 38. For operation, the function switch 44 is placed in its fourth or *d* position whereby the output signal between the output terminals 24 and 25 is determined by the magnitude of the input signal applied by the network 38 to the input terminals 6 and 7.

Under many conditions the current amplifier 22 may be omitted and the output terminal 24 connected directly to the output terminal 20 of the amplifier 1. However, in many instances the current output magnitude of the amplifier 1 is insufficient to drive the equipment which may be connected to the output terminals 24 and 25. Under these conditions the current amplifier 22 is provided to supply the necessary current magnitude. As discussed above, the current amplifier 22 is not affected by changes in temperature of the transistors T3–T6 and a true current amplified output signal is obtained at the output terminals 24 and 25.

It will now be apparent that this invention provides a highly accurate direct current amplifier for use with sensing networks in which the amplification may be varied at will without interfering with any compensation already established for any unbalance in the sensing network 38 and in which the calibration between the sensing network 38 and the output of the amplifier 1 may be easily checked. Further, this invention provides an arrangement in which a common source of direct current potential may be used to power the current amplifier, the high gain amplifier, the constant current network 32 and the power for the sensing network 38.

What is claimed and is desired to be secured by United States Letters Patent is as follows:

1. In combination a direct current power source having first and second and third power supplying terminals, said source being effective to maintain the potential of its said first terminal positive relative to its said third terminal and the potential of its said second terminal negative relative to the potential of its said third terminal, first and second power output terminals, first and second signal input terminals, first and second signal output terminals, a high gain differential amplifier having first and second signal input connections and first and second power input connections and a signal output connection, said amplifier being effective to provide an output signal-potential at its said signal output connection relative to the potential at one of its said power input connections, said output signal-potential having a magnitude which is a function of the difference in potential between its said signal input connections, first and second potential dropping devices, first circuit means connecting said first power supplying terminal to said first power output terminal and including said first potential dropping device, second circuit means connecting said second power supplying terminal to said second power output terminal and including said second potential dropping device, a sensing network connected between said power output terminals, said network including a current conducting path having a bias potential establishing point, said path being effective when energized from said source through said potential dropping devices to establish a potential at said power output terminals which is less than the potential established by said source between its said first and second terminals and to establish a bias potential at said point which is intermediate the potentials of said first and second power supplying terminals, said sensing network including a condition sensing means connected across said signal input connections, said sensing means being effective to establish an input signal-potential between said signal input connections which has a magnitude that is a function of the magnitude of the condition sensed by said condition sensing means, said sensing means being operatively connected to said bias potential establishing point to bias said input signal-potential with respect to the output potential of said source, third circuit means connecting said first signal input terminal to said first signal input connection, fourth circuit means connecting said second signal input terminal to said second signal input connection, fifth circuit means connecting said first power supplying terminal to said first power input connection, sixth circuit means connecting said second power supplying terminal to said second power input connection, said fifth and sixth circuit means being connected to said power supplying terminals independently of said potential dropping devices, seventh circuit means connecting said output connection to said first signal output terminal, and eighth circuit means connecting said second signal output terminal to said third power supplying terminal to establish a potential at said second signal output terminal which has a desired magnitude with respect to the potential of said third power supplying terminal.

2. The combination of claim 1 in which there is provided means for adjusting the potential drop across said first and second potential dropping devices.

3. The combination of claim 1 in which said first and second potential dropping devices comprise respectively first and second resistors, said resistors being of substantially equal ohmage, and in which there is provided a third resistor connected in shunt circuit with said power output terminals for determining the potential drop across said first and second resistors, said third resistor being variable in magnitude.

4. The combination of claim 3 in which there is provided a first and a second potential establishing device and means for determining the potentials established by said potential establishing devices, said first potential establishing device is being connected in said third circuit means between said first signal input terminal and said first signal input connection, and said second potential establishing device being connected in said fourth circuit means between said second signal input terminal and said second signal input connection.

5. The combination of claim 4 in which said first and second potential establishing devices comprise respectively fourth and fifth resistors, said means for determining the potentials established by said potential establishing devices comprising a constant current establishing network including means which determines the magnitude of the constant current supplied to said fourth and fifth resistors.

6. The combination of claim 4 in which said first and second potential establishing devices comprise fourth and fifth resistors, said means for determining the potentials established by said potential establishing devices comprising first and second transistors and sixth and seventh and eighth resistors and a potentiometer having a resistance element and a movable contact, each said transistor having a pair of main electrodes and a control electrode, said movable contact being connected to said first power supplying terminal, said sixth resistor being connected between *a* first of said main electrodes of said first transistor and *a* first end portion of said resistance element, said seventh resistor being connected between a first of said main electrodes of said second transistor and the second end portion of said resistance element, said control electrodes of said transistors being connected together, said eighth resistor being connected between said control electrodes and said second power input terminal, the second of said main electrodes of said first transistor being connected to said third circuit means intermediate said fourth resistor and said first signal input connection, and the second of said main electrodes of said second transistor being connected to said fourth circuit means intermediate said fifth resistor and said second signal input connection.

7. The combination of claim 6 in which there is provided a bridge network having a pair of power input connections and a pair of signal output connections, said input connections of said bridge network being connected to said power output terminals and said signal output connection of said bridge network being connected to said signal input terminals.

8. The energizable network of claim 7 in which there is provided a function switch and an indicating instrument, said switch having a first position in which said first and second signal input connections are connected together and said instrument is connected between said first and second signal output terminals, said switch having a second position in which said signal input connections are responsive to the magnitude of the signal at said first and second signal input terminals and said instrument is connected between said first and second signal output terminals, said switch having a third position in which said signal input connections are responsive to the magnitude of the signal at said first and second signal input terminals and said instrument has its input connections shorted together, said switch having a fourth position in which said instrument is connected across said first and second power output terminals.

9. An amplifying network, said network comprising, first and second and third input terminals, first and second signal input terminals, first and second signal output terminals, a high gain differential amplifier having first and second signal input connections and first and second power connections and a signal output connection, said amplifier being effective to provide a potential at its said output connection with respect to the potential at one of its said power connections the magnitude of which is a function of the potential difference between its said signal input connections, first and second potential establishing devices, first circuit means connecting said first establishing device between said first signal input terminal and said first input connection, second circuit means connecting said second potential establishing device between said second signal input terminal and said second input connection, a constant current establishing controlling network connected between said first and said second power input terminals for energization by the potential established therebetween, said constant current controlling network having first and second constant current paths, a third circuit means connecting said first potential establishing device in said first path for energizing said first potential establishing device with constant current to establish a first constant potential thereacross, a fourth circuit means connecting said second potential establishing device in said second path for energizing said second potential establishing device with constant current to establish a second constant potential thereacross, first control means for controlling the magnitude of the constant current in each of said paths, fifth circuit means connecting said power connections to said first and second power input terminals, sixth circuit means connecting said signal output connection to said first signal output terminal, seventh circuit means connecting said second signal output terminal to one of said power input terminals second control means for establishing the magnitude of an initial potential between said signal output connection and said third power input terminal when an initial potential is applied between said signal input connections.

10. The amplifying network of claim 9 in which said constant current establishing network comprises a pair of transistors and first and second and third resistors and a potentiometer, each of said transistors including a pair of main electrodes and a control electrode, said potentiometer including a resistance element and a movable contact movable along said resistance element, said movable contact being connected to said first power input terminal, said first resistor being connected between one end portion of said resistance element and a first of said main electrodes of a first of said transistors, said second resistor being connected between the other end portion of said resistance element and a first of said main electrodes of the second of said transistors, said third circuit means comprising means connecting the second of said main electrodes of said first transistor to said first potential establishing device, said fourth circuit means comprising means connecting the second of said main electrodes of said second transistor to said second potential establishing device, and said control electrodes being connected together and to said second power input terminal through said third resistor.

11. The amplifying network of claim 10 in which said constant current network includes means to limit the potential which is impressed between said movable contact and each of said control electrodes.

12. The amplifying network of claim 10 in which said first and second potential establishing devices comprise respectively third and fourth resistors and in which said first and second means includes individually a fifth and a sixth resistor respectively, said fifth resistor being connected between said third resistor and said first signal input connection, and said sixth resistor being connected between said fourth resistor and said second signal input connection.

13. The amplifying network of claim 12 in which the resistance of said fifth and sixth resistors is greater than the resistance of said third and fourth resistors by an order of magnitude which is not appreciably less than 2.

* * * * *